Patented Sept. 29, 1936

2,056,142

UNITED STATES PATENT OFFICE 2,056,142

PROCESS FOR MAKING UREA-ALDEHYDE CONDENSATION PRODUCTS

Kurt Ripper, Vienna, Austria, assignor to American Cyanamid Company, New York, N. Y., a corporation of Maine No Drawing. Original application July 27, 1923, Serial No. 654,260. Divided and this application September 1, 1934, Serial No. 742,447

3 Claims. (Cl. 260—3)

The present invention relates to the manufacture of condensation products obtained by the reaction of formaldehyde on a urea.

A method of manufacturing condensation products of this kind is described in the U. S. Patent No. 1,458,543 (Pollak). This process consists essentially in reacting on a urea with formaldehyde in the presence of a base. Further investigation work in this direction led to the unexpected observation that in heating the condensation solution for a longer period, an acid reaction is produced in the material after the condensation process is concluded, notwithstanding the fact that rather large quantities of basic condensation agents had been used in the process. The acid reaction taking place is to be ascribed to the known circumstance that aldehydes, when heated for a longer period in alkaline solution, are in part converted into the corresponding acids. In the present case formic acid is formed from the formaldehyde.

This acid reaction is one of the chief difficulties in producing faultless final products on an industrial scale, even when avoiding the use of formaldehyde in excess. Should therefore an acid reaction be detected in the fluid material, the present invention provides that additions be made to the intermediate products before the process is further proceeded with, for the purpose of reducing or precluding the concentration of H-ions. This produces under regular working conditions, a highly perfected material capable of being worked industrially (for instance turned). Material produced as hereinbefore outlined is insoluble and resilient and is remarkably insensitive to sudden heating and cooling.

The above is of course all the more important as regards material produced without making an addition of basic condensation agents during the first phase of the process and which therefore contains hydrogen ions in a high concentration. Material which is usable may, however, be produced in this case, provided that the acid reaction in the condensed intermediate product is weakened or completely neutralized before the process is proceeded with. The new rule is therefore of general importance whether or not the first phase of the process is carried out with condensing agents. The said rule is important as regards a uniform industrial production of the material under consideration, as well as in connection with certain industrial uses to which the material is put.

The process is carried into practice preferably by accurately determining (by titration for example) the proportion of acid in the fluid mass after the first stage of the condensation is completed and thereafter adding the required quantity of substances possessing basic properties. The most varied compounds may be used therefor; they may be strong or weak bases or salts exerting a basic action. The action of these substances however is not always the same in all cases.

The process described in the U. S. Patent No. 1,507,624 aims at rendering innoxious the free formaldehyde still present in the first formed soluble condensation products before they are transformed into insoluble final products by further heating. For this purpose substances capable of binding or destroying formaldehyde may be used (e. g. urea or thiourea). After testing the solution of the soluble condensation products for free formaldehyde, the amount of additions necessary for completely eliminating the formaldehyde, is determined by stoichiometrical calculation without regard to the acidity of the product.

When according to the present invention urea is used, the quantity of urea which is necessary for binding the formaldehyde, has to be augmented by the amount necessary to reduce or preclude the acid reaction. For my purposes any substance may be used which under the given conditions is capable of diminishing the hydrogen ion concentration, irrespective of whether this substance is capable of acting upon formaldehyde or not.

According to the invention, a urea can be reacted with formaldehyde, in the presence of the latter in excess. This leaves a somewhat glue-like (i. e. thick viscous liquid) intermediate product containing some free formaldehyde. Then basic substances, such as urea, can be used, or other substances capable of uniting with formaldehyde, along with such salts as sodium acetate. Then the conversion into the hard final product can be conducted in the known manner, which involves distilling off water, casting the product and hardening at temperatures above 60° C., say at between 60 and 100° C.

I have found that the intermediate product may contain acid substances.

The present process renders it possible to impart the desired properties to the final products resulting from the reaction between urea and formaldehyde. Under certain circumstances however the material becomes cloudy when the condensation products are converted into their final and insoluble condition. This is of course immaterial as regards many ultimate uses. The process comprising the present invention however provides a very simple method of producing final products having the transparency of glass and which are resilient, insoluble to the highest degree, insensitive to differences in temperature and adapted to be worked (for instance turned).

It has been found most unexpectedly that the above-mentioned cloudiness is affected or even totally removed by the addition of ions produced from salts, which are electrolytically dissociated in aqueous solutions. The activity of these additions is stepped in the sequence of Hofmeister's ion series, which hold good for other phenomena. (Cf. e. g. "The Chemical Age", Chemical Dictionary, London, Ernest Benn Limited, 1924, page 78). The said series show the following sequence of cations for a constant anion:

Fe, Al, K, NH₄, Cu, Mg, Zn, Ca, Na, whereas the anions form the following sequence for a constant cation:

$SO_4''$, citrate $'''$, oxalate $''$, $(CH_3COO)'$,
$ClO_3'$, $Cl'$,
$CO_3''$, $NO_3'$, $Br'$, $CN'$, $CNS'$, I, O-salicylate$'$ When a constant anion, such as for instance chloride ion clarification increases from left to right in the cation series. Clarification is complete for example with sodium chloride and also with crystallized calcium chloride. On the other hand, potassium chloride for example clarifies the material to a certain extent, but never completely even if used in large quantities. The difference in the action of anions with constant cation is still more marked; in this case also clarification rises in a direction from left to right, that is to say toward the salicylate ion. The clarifying power of sulphate ion is almost nil; that of chloride ion is strong and that of salicylate ion is strongest.

The Hofmeister series have not always exactly the form as stated; certain fluctuations may occur under particular circumstances. The action of the anions and cations is mostly additive.

Cloudiness may also be prevented from forming by preventing the free hydrogen ions from being completely neutralized. This method is however the most difficult, as it is a matter of steering a correct course between a degree of concentration of hydrogen ions liable to affect detrimentally the properties of the final product when the latter is hardening, and a completely neutral condition of the material liable to give rise to cloudiness in the hardened product. Consequently the degree of concentration has to be kept within very narrow limits, so that a far easier and safer method is to preclude the acid reaction completely, or almost so, and to resort to the addition of salts electrolytically dissociated in aqueous solutions.

The following are examples of carrying the invention into practice:

(1) 240 parts by weight of urea, 640 parts by weight of formaldehyde (37% solution by weight) and 24 parts by weight of hexamethylenetetramine are heated to produce a clear and aqueous condensation product, then the free formaldehyde content of the condensation solution is determined according to known methods. In the present case there would be found 24 parts of free formaldehyde, computed with respect to the total weight of the condensation material. The latter is mixed with five parts by weight of sodium acetate to prevent a premature gelatinization, and is thereafter concentrated by evaporation in a vacuum. A sample of the said material is titrated after the bulk of the water is expelled, the amount of the base to be added being determined according to the degree of concentration of the free hydrogen ions. Assuming that in the present case e. g. 30 parts by weight of urea are added of which 24 parts of the urea with 24 parts formaldehyde react and a condensation product is formed in such a way that for every two molecules formaldehyde one molecule urea is used. The remainder (six parts) of the urea acts as a basic medium.

After the water is distilled off until the material is fit to be cast, the relatively stable solution is poured into moulds and hardened at a temperature of 60° to 100° C. rendering the product infusible and insoluble. This material becomes cloudy after it has been hardening for a short period of time, and articles made therewith are good, although somewhat cloudy.

A material having the transparency of crystal may be produced by adding thereto (before or while water is distilled therefrom) 24 parts of sodium chloride (in accordance with normality $-0.5$, by normality being understood the proportion of the number of grammes of active substances actually contained in one litre of the reaction mixture to one gramme-molecule of the same substance.) No cloudiness occurs in this case; the material retains as complete a transparency as that of glass in its final hardened state.

(2) Only 24 parts by weight of urea, in addition to 2.4 parts by weight of melamin

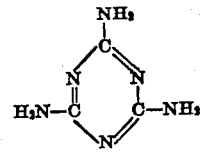

are added to the material produced as in Example 1, the remaining water being carefully removed by distillation. The material thus obtained has the transparency of water, but becomes cloudy after a day's hardening. The said material however is extraordinarily insensitive to variations in temperature; it remains perfectly unaffected under sudden changes of temperature of 50° C.; after hardening at a temperature of over 80° C. the said material is hard and faultless, although slightly cloudy. If 3% of crystals of calcium chloride is added to the material while the water is being distilled off, a product is obtained after hardening which has the transparency of glass.

(3) A condensation product obtained by boiling one part by weight of urea and five parts by weight of formaldehyde solution (37% by weight) without using condensing agents, is concentrated by evaporation in a vacuum. Two parts of pyridine are added, together with a quantity of urea equal to 9% the initial weight, after the bulk of the water is expelled by distillation. The material soon becomes cloudy while hardening, but yields otherwise a homogeneous insoluble final product. By adding 3% of sodium chloride, reckoned on the amount of material subjected to distillation, to the material, the latter hardens in a completely clarified state and yields a product which has the transparency of crystal.

(4) If in a similar manner as described in Example 2 an addition of 24 parts by weight of sodium salicylate or 24 parts by weight of potassium iodide is made, these additions (which correspond only to a proportion of 0.2 normality) render it possible to obtain a product of dazzling transparency. Sodium chloride would not quite clarify the material at the normality 0.2.

I wish it to be understood that I do not desire to be limited to the exact details described, for obvious modifications will occur to a person skilled in the art.

Instead of urea, thiourea or substitution products of urea or of thiourea may be used, all of which I wish to be included along with urea in the designation "a urea" used in the following claims. The formaldehyde may be used either in the commercial aqueous solution or in the gaseous state or in the form of a solution of anhydrous formaldehyde or in the form of the polymers.

This application is a division of my application Serial No. 654,260, filed July 27, 1923, now Patent No. 1,972,110.

What I claim is:

1. The improvement in the process of producing resinous bodies from a mixture of a urea and formaldehyde which comprises the step of buffering the mixture by adding a compound exerting a basic action.

2. In the process of producing a material capable of being transformed at elevated temperatures into a relatively hard, insoluble shaped article by reacting urea with formaldehyde in an aqueous solution, which reaction is characterized by the tendency of the solution spontaneously to become more acid during the said reaction, the step which comprises controlling the increase of acidity by adding a substance exerting a basic action, in an amount sufficient to keep the acidity at a sufficiently low point so that faultless final products may be readily obtained.

3. The relatively stable condensation product of urea and formaldehyde, capable of transformation at elevated temperature into a relatively hard, infusible and insoluble shaped article, which is obtained by reacting urea and formaldehyde, under conditions such that the acidity of the reaction mass during condensation and during water removal is maintained at a nondetrimental value close to neutrality, and adding a salt of the series consisting of the cations Fe, Al, K, $NH_4$, Cu, Mg, Zn, Ca and Na, and the anions $SO_4$, citrate, oxalate, acetate, $ClO_3$, Cl, $NO_3$, Br, CN, CNS, I, O-salicylate.

KURT RIPPER.